United States Patent [19]

Jurgensmeyer

[11] Patent Number: 5,037,266
[45] Date of Patent: Aug. 6, 1991

[54] COMPOST SUPPLEMENT SPREADER

[76] Inventor: Virgil H. Jurgensmeyer, Rte. 2, Box 15, Miami, Okla. 74354

[21] Appl. No.: 507,652

[22] Filed: Apr. 4, 1990

[51] Int. Cl.$^5$ ............................................. B65G 21/10
[52] U.S. Cl. ................................... 414/528; 222/612;
414/523; 414/503; 198/861.1; 198/300;
198/550.01
[58] Field of Search ............... 414/495, 460, 528, 527,
414/498, 501, 502, 503, 523; 198/861.1, 300,
550.01, 523; 222/612, 608, 622; 239/663, 672

[56] References Cited

U.S. PATENT DOCUMENTS

| 3,180,601 | 4/1965 | Belt | 414/498 X |
|---|---|---|---|
| 3,474,935 | 10/1965 | McKinney et al. | 222/612 X |
| 3,482,717 | 12/1969 | Moser | 414/528 |
| 3,768,628 | 10/1973 | Bross | 414/495 X |
| 4,372,725 | 2/1983 | Moore et al. | 414/528 X |

FOREIGN PATENT DOCUMENTS 3406108 8/1985 Fed. Rep. of Germany ...... 222/612

Primary Examiner—Frank E. Werner
Attorney, Agent, or Firm—Head & Johnson

[57] ABSTRACT

A compost supplement spreader for delivering supplement to the top of an elongated compost pile, the spreader being formed of a frame having spaced apart sides, wheels mounted on the frame for movement of the frame on the earth with the compost pile being positioned between the frame sides, a hopper elevationally supported between the frame sides, the hopper having a lower position whereby supplement may be deposited in the hopper open top and having an upper operating position whereby the hopper bottom clears the top of the compost pile and a conveyor belt in the bottom portion of the hopper for controllably discharging supplement from the hopper onto a compost pile.

8 Claims, 7 Drawing Sheets

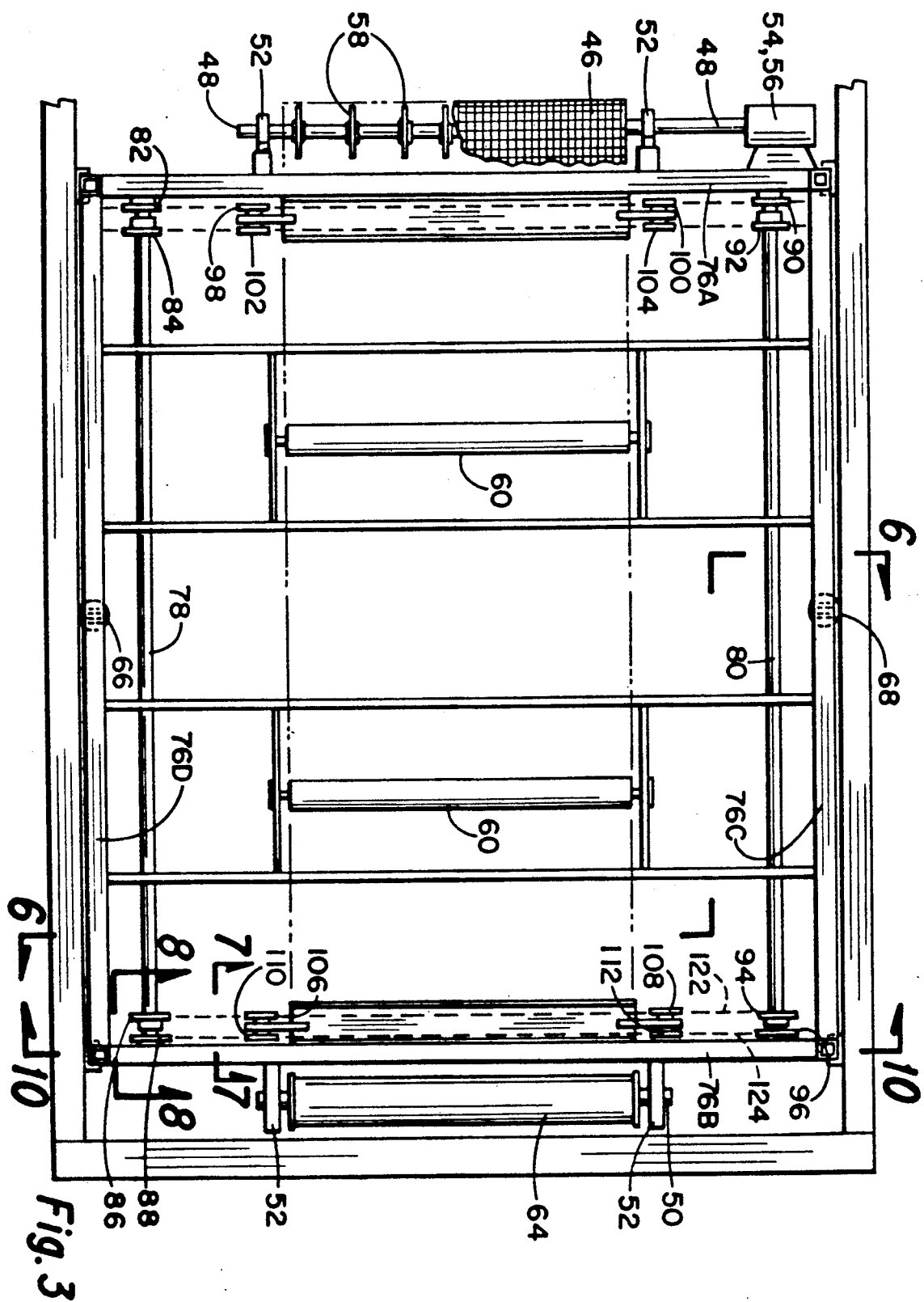

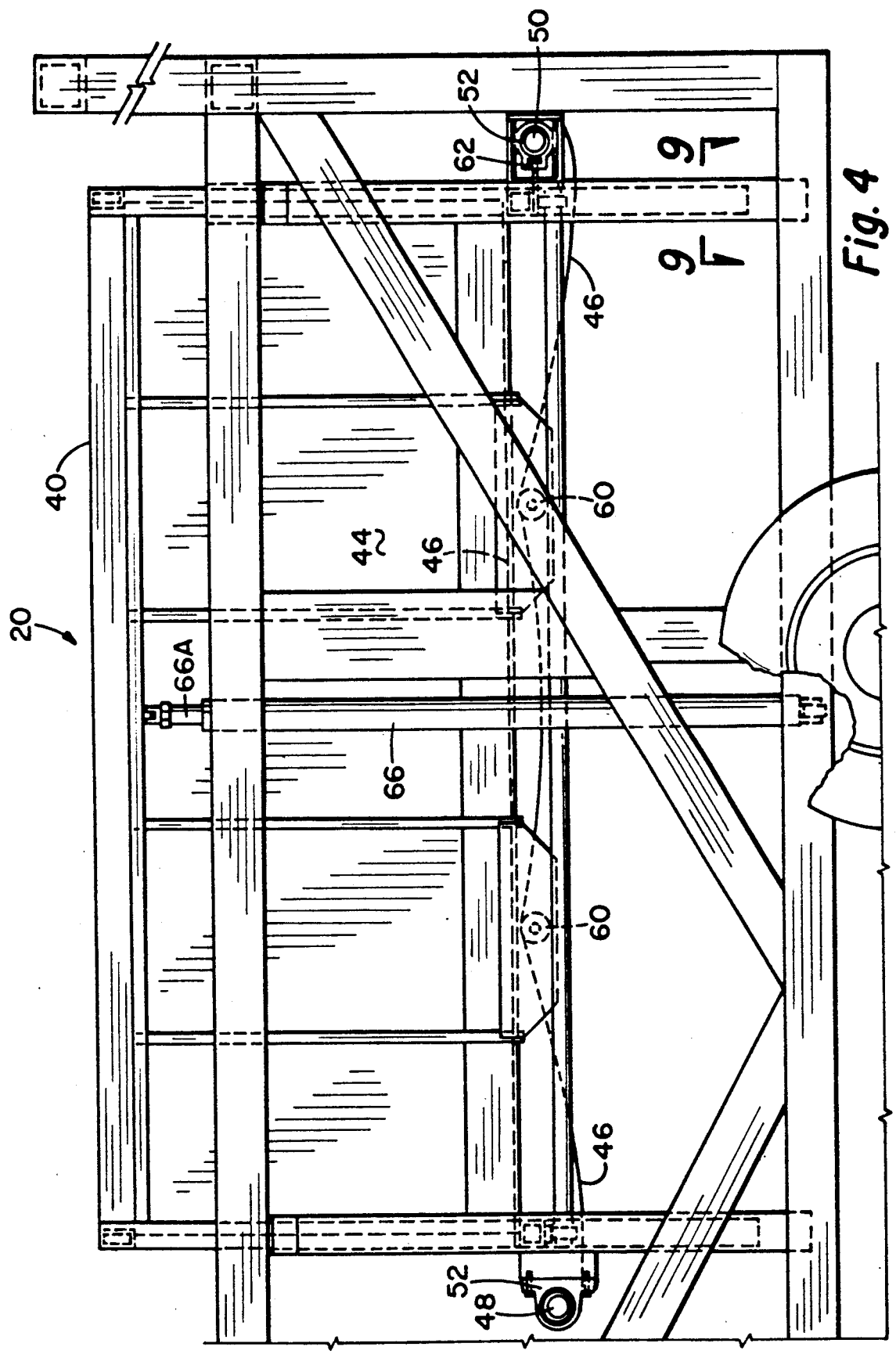

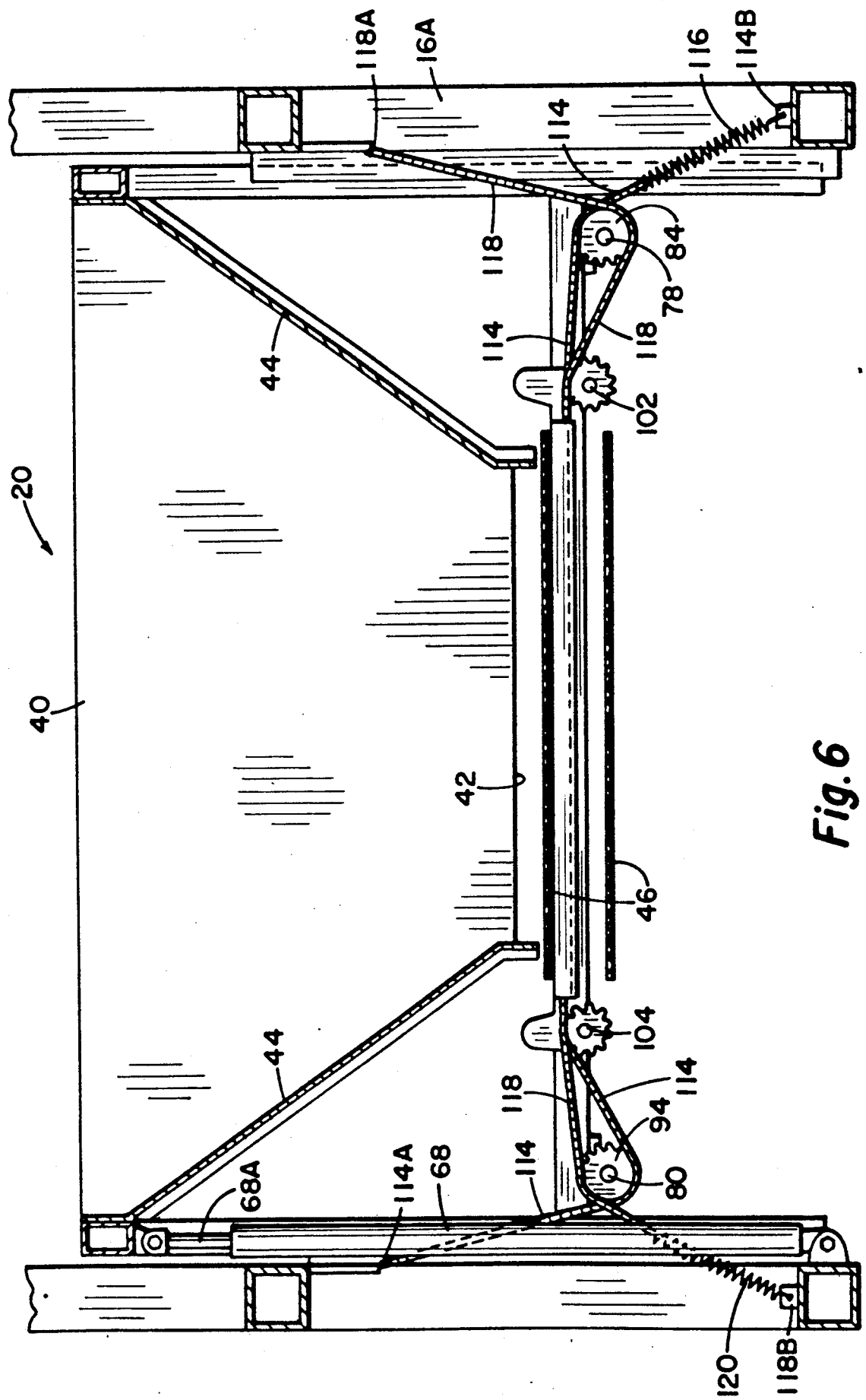

COMPOST SUPPLEMENT SPREADER

SUMMARY OF THE INVENTION

Mushroom farming has become an important industry in the United States and many other countries around the world. Mushrooms are typically grown indoors in containers having carefully prepared compost as the growth medium. The compost is prepared in large quantities and typically in elongated compost piles on the surface of the earth. Supplement must be periodically added to the compost pile.

At the present time, compost supplement spreaders in common use are of the type which must be loaded from overhead bins or with a front end loader mounted on a tractor in which the tractor is driven up a ramp so the loader bucket is high enough to dump the supplement into the hopper of the spreader. Not all farms have overhead bins, and driving a tractor with a front end loader filled with supplement up a ramp creates serious safety problem.

The only other existing alternative in common use today is to build a very short sided hopper with limited capacity so that it can be loaded by means of a front end loader affixed to a tractor, with the tractor operating on level ground. Most equipment offered by implement manufactures today is of the type having a fixed height hopper that must be loaded from ground level.

The present disclosure is of a compost supplement spreader having an elevationally positionable hopper. The hopper can be lowered to permit loading with supplement and then raised to an operating level. In the operating level the spreader includes provisions for controllably discharging a supplement from a hopper as the spreader moves along an elongated compost pile.

In the present disclosure the compost supplement spreader is formed of a frame having spaced apart sidewalls, the walls being spaced sufficiently wide apart so as to allow the frame to move over an elongated compost pile, with one of the frame sidewalls on each side of the compost pile. Wheels are mounted on the bottom portion of the frame to provide for movement of the frame over the earth with an elongated compost pile under the upper portion of the frame.

A hopper is provided having an open top and an open bottom and sidewalls, with the width of the hopper being less than the spacing between the frame sidewalls.

Hydraulic cylinder pistons are employed for elevationally positioning the hopper within the frame. By means of such hydraulically controlled cylinder pistions the hopper can be lowered to a loading position wherein supplement may be deposited in the open top. This can be done by means of a tractor having a front end loader, with the tractor operating at ground level and with the front end loader bucket extending up and over one of the sidewalls to dump supplement into the hopper.

After the hopper is filled it is raised to an operating position by control of hydraulic fluid to the cylinder piston devices. The operating position of the hopper affords an elevation such that the bottom of the hopper clears the top of the elongated compost pile.

A wide, endless belt is supported on spaced apart rollers affixed to the hopper. The belt extends beneath the hopper open bottom and normally closes the open end of the bottom against the discharge of supplement. Power is supplied to one of the rollers to cause the belt to rotate and to thereby controllably discharge supplement from the hopper.

When raising and lowering the hopper within the frame sidewalls it is important that the hopper be positionally stabilized. This is accomplished by use of a first and a second elongated horizontal shaft rotatably supported to the hopper, with the shafts being parallel to and spaced apart from each other. Affixed to each of the shafts adjacent each end thereof are two spaced apart sprockets, there being thereby a total of eight such sprockets. The sprockets are arranged on the shafts so that there is one sprocket on each shaft in four different vertical planes.

Four chains are provided, one in each of the planes. Each chain loops over the top of one of the sprockets in its plane and under the bottom sprocket affixed to the other of the shafts. The chains are preferably attached at one end to the upper portion of one of the frame sidewalls and at the other end to the lower portion to the other of the frame sidewalls. The chain and sprockets function to maintain the hopper in a stabilized position at all times as the hopper is moved from an upper to a lower position and vise versa.

Others have provided mobile structures with widely spaced apart wheels arranged for carrying objects by the frame between the wheels and for reference to background material relating to such structures see the following U.S. Pat. Nos. 2,404,898; 3,146,903; 3,482,720; 3,655,081; 4,306,707.

A better understanding of the disclosure will be had by the following description and claims, taken in conjunction with the attached drawing.

DESCRIPTION OF THE DRAWINGS

FIG. 3 is a top plan view of the compost supplement spreader showing a portion of the spreader frame and showing the basic frame structure of the hopper with the hopper itself removed to show details of the hopper stabilizer system.

FIG. 4 is a partial elevational side view of the compost supplement spreader showing a portion of the frame and hopper and showing the mounting of the supplement discharge belt.

FIG. 6 is an elevational cross-sectional view taken along the broken line 6—6 of FIG. 3 and showing details of the hopper stabilizer system.

DESCRIPTION OF THE PREFERRED EMBODIMENT

Figure 1:
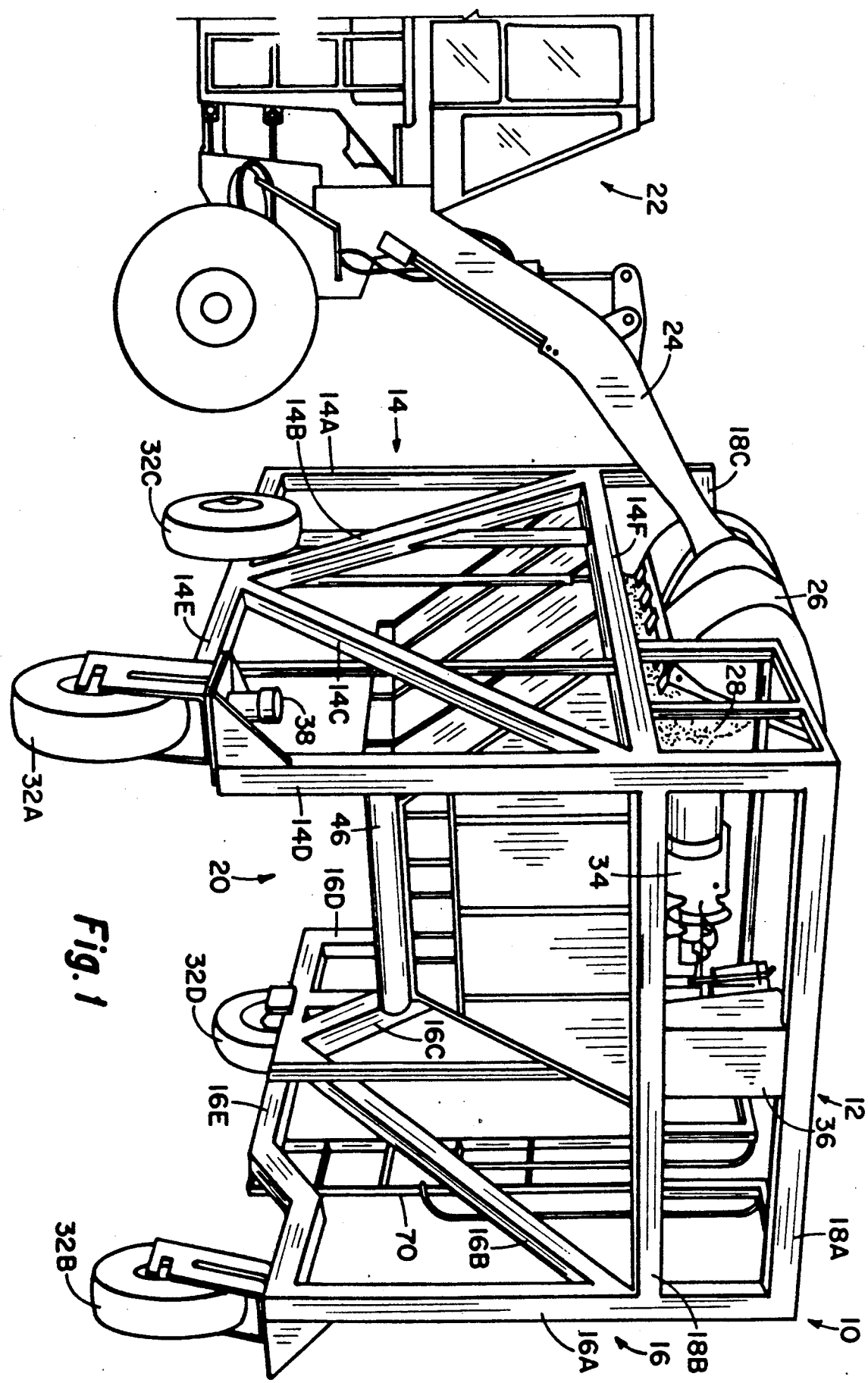
FIG. 1 is an isometric view showing a compost supplement spreader of this disclosure having a hopper for receiving a supplement therein, showing the hopper in the loading position and showing the front end portion of a tractor having a front end loader, with the front end loader extending up for dumping a load of supplement into the hopper.

FIG. 1 shows a compost supplement spreader of this disclosure, generally indicated by the numeral 10. The supplement spreader includes a frame, generally indicated by the numeral 12. The frame is formed essentially of a first vertical sidewall, generally indicated by the numeral 14, and a second vertical sidewall, generally indicated by the numeral 16. Sidewall 14 is formed in part by structural members 14A through 14F. The second vertical sidewall 16 is formed by structural members 16A through 16E. All of the structural members employed in the vertical sidewalls are not necessarily illustrated or identified, it being understood that the frame 12 is generally formed of spaced apart vertical sidewalls 14 and 16. The sidewalls are supported together adjacent their upper ends by horizontal structural members, such as 18A through 18C as seen in FIG. 1.

Supported by the frame 12 and between the vertical sidewalls 14 and 16 is a hopper, generally indicated by the numeral 20. The function of hopper 20 is to receive compost supplement therein, and the function of the spreader 10 is to spread such supplement atop elongated compost piles.

FIG. 1 shows a tractor, generally indicated by the numeral 22, that is sometimes called a front end loader. The tractor 22 has an arm 24 thereon that is pivoted from a lower to an upper position. On the outer end of arm 24 is a pivotal bucket or scoop 26. Supplement can be picked up, such as from a pile on the earth or a horizontal surface within a building, and by means of the tractor 12, moved to the compost spreader 10. FIG. 1 shows the tractor in position with the scoop 26 over hopper 20 and with compost supplement being dumped into the hopper 20. It is understood that the tractor 20 and the elements 24 and 26 are not part of the invention which is disclosed. FIG. 1 shows how the compost spreader is utilized to receive the deposit of compost supplement 28 for later disposition on the top of an elongated compost pile.

Figure 2:
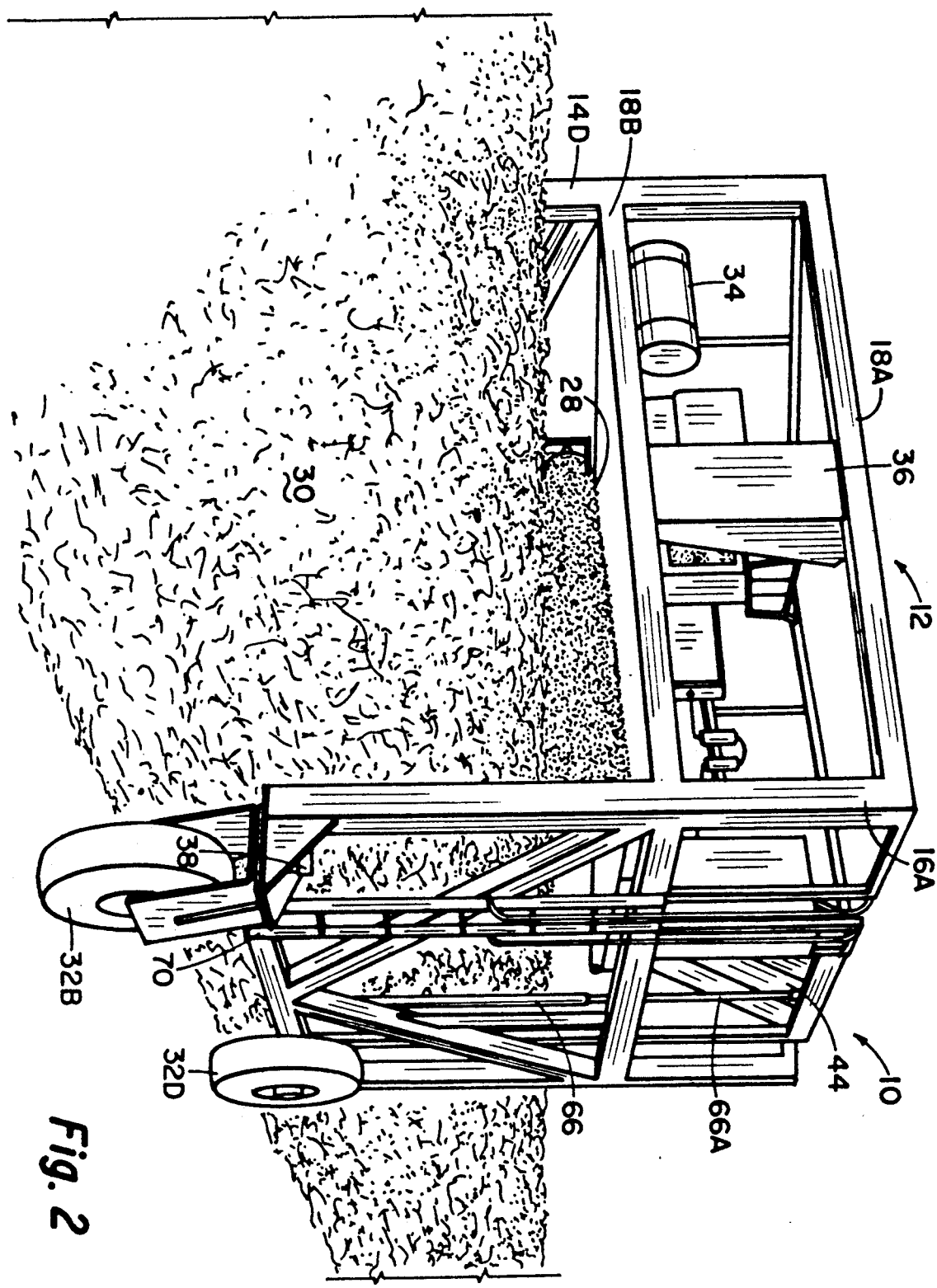
FIG. 2 is an isometric view of the compost supplement spreader of this disclosure as it is positioned astride an elongated compost pile in the process of depositing supplement on top of the compost pile.
Figure 7:
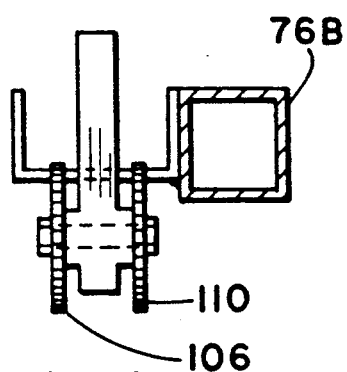
FIG. 7 is a partial cross-sectional view taken along the line 7—7 of FIG. 3 and showing the means of support of a pair of idler sprockets as used in the hopper stabilizer system.
Figure 8:
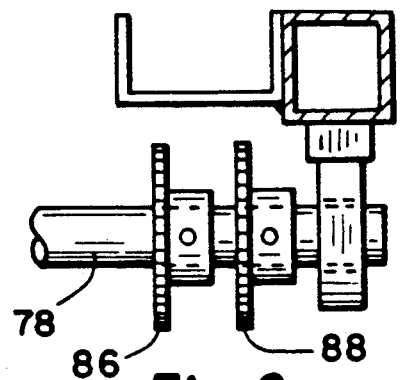
FIG. 8 is a partial cross-sectional view taken along the line 8—8 of FIG. 3 and showing one end portion of one of the stabilizer shafts and showing the two sprockets supported thereon.

FIG. 2 shows an elongated compost pile 30 and shows the supplement spreader 10 astride the compost pile and depositing supplement 28 thereon. As seen in FIGS. 1 and 2, frame 12 has, affixed to the lower portion thereof, wheels 32A through 32D. Mounted on an upper platform in the forward portion of frame 12 is a source of hydraulic fluid pressure 34. This hydraulic pressure source 34 is of the normal type that typically consists of an engine, a pump, a hydraulic fluid reservoir and pressure tank, with pressure controls and so forth, all of which are not shown in detail as being well-known to those skilled in the art of hydraulic controls.

Further, frame 12 includes an operator station 36, an operator not being shown. An operator can, by hydraulic controls, steer at least wheels 32A and 32B which are mounted on pivotal casters 38, only one of which is shown in FIGS. 1 and 2. Motive force can be applied by hydraulic motors (not seen) connected to wheels 32C and 32D. In any event, by means of a hydraulic source 34 an operator at operation station 36 can guide the spreader along and astride a compost pile 30, as in FIG. 2, and, further, the spreader can be moved on the earth to a location to receive additional compost supplement 28 as required.

An important feature of the compost supplement spreader 10 is the provision wherein the hopper 20 may be raised and lowered. As seen in FIG. 6, the hopper 20 includes an open top 40, an open bottom 42 and sidewalls 44, the sidewalls 44 tapper downwardly and inwardly so that the open bottom 42 is substantially smaller than the open top 40. Hopper 20 provides means of retaining a substantial quantity of compost supplement that can be discharged at a controllable rate to the top of an elongated compost pile.

Figure 5:
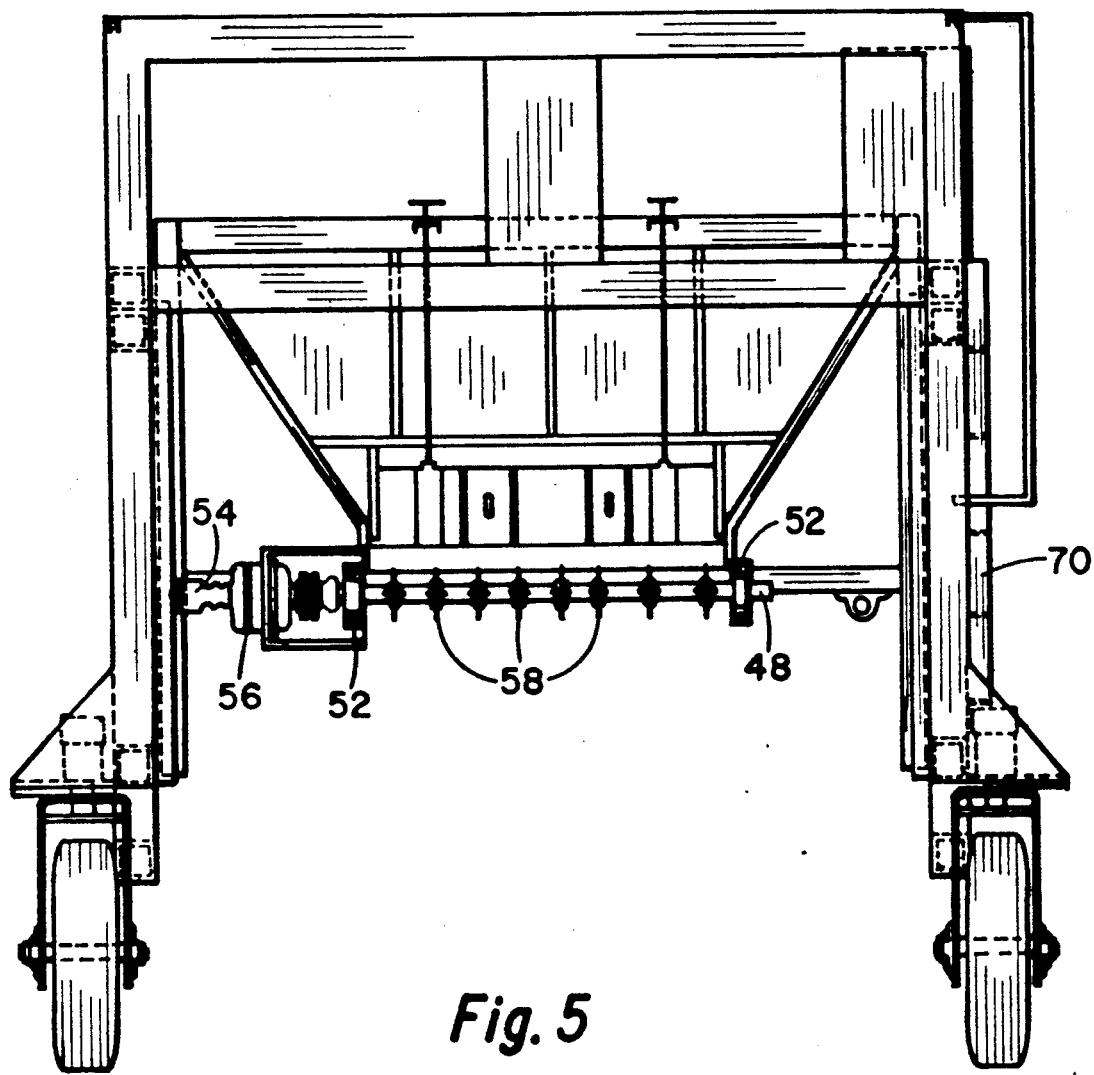
FIG. 5 is a front elevational view of the compost supplement spreader with the hopper in the lower position and with the conveyor belts removed to show the details of the conveyor belt support structure.

The open bottom 42 of the hopper 20 is closed against discharge of supplement therefrom by means of an endless belt 46. As seen in FIG. 4, a horizontal shaft 48 is supported to the hopper 20, the shaft being at the forward end of the hopper. At the rearward end of the hopper 20 a second shaft 50 is provided. The shafts are supported by pillow block bearings 52. As seen in FIG. 5, the forward shaft 48 is controllably rotated by means of a hydraulic motor 54 through a differential drive 56. FIG. 3 shows shaft 48 with a plurality of belt sprockets 58 thereon. Shaft 50 has a non-drive belt sheave thereon (not seen). The endless belt 46 is carried by belt sprockets 58 on each of the shafts 48 and 50, and as rotational energy is supplied by hydraulic motor 54, the belt moves around the shafts and is thereby carried underneath the hopper open bottom 42 to carry a thin layer of supplement thereon that is deposited off the end of the belt and onto the top of compost pile 30, as shown in FIG. 2.

FIG. 4 shows belt idlers 60 supporting the lower loop of the belt. Also shown in FIG. 4, the spacing of shaft 50 from shaft 48 is adjustable by a belt tensioner 62.

FIG. 3 shows the belt supporting shafts 48 and 50 and shows diagrammatically a combination hydraulic motor and differential drive 54 and 56, and belt sprockets 58 on shaft 48. Endless belt 46 is partially shown. In this arrangement the belt shaft 50 supports an elongated belt sheave 64 on which the belt rotates. The belt sprockets 58 are required on shaft 48 since shaft 48 is the drive shaft, whereas shaft 50 and belt sheave 64 are non-driven. The belt idlers 60 are shown in FIG. 3.

An important feature of this disclosure is the provision of a supplement spreader in which the hopper 20 can be lowered to received supplement therein and then raised to an operating position wherein the spreader clears the top of an elongated compost pile to deliver supplement thereon. The hopper is raised by a pair of hydraulic cylinders 66 and 68. Each of the cylinders has a piston extending therefrom, indicated by 66A and 68A respectfully. The hydraulic cylinders 66 and 68 are vertically orientated, with the lower end of the cylinders being affixed to the frame adjacent the lower end thereof and with the upper end of pistons 66A and 68A being affixed to the hopper adjacent the top thereof. By control of hydraulic pressure hopper 20 can thereby be raised and lowered. FIG. 1 shows hopper 20 in a lowered position, whereas FIG. 2 shows the hopper raised to the upper position. Hydraulic energy may be applied simultaneously to hydraulic cylinders 66 and 68 from the hydraulic source 34 and controlled by an operator at station 36. To enable the operator to climb from the earth's surface to the operating position, a ladder 70 affixed to frame 12 is provided and is seen in FIGS. 1, 2 and 5.

Figure 9:
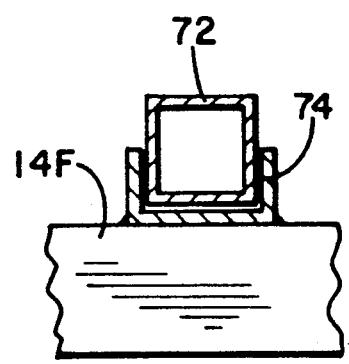
FIG. 9 is a partial cross-sectional view taken along the line 9—9 of FIG. 4 and showing the details of the hopper vertical guidance system.

FIG. 9 shows a means of guiding the hopper in its up and down position. The hopper has adjacent each corner a vertical structural member, such as a length of square tubing 72. Affixed to the frame sidewalls are structural guide members, such as channels 74. The channels 74 are affixed to structural members, such as horizontal member 14F of the first vertical sidewall 14. There are, as shown in FIG. 9, four of the hopper vertical guide structural members 72 and four mating channel guide members 74 affixed to the frame so that the hopper is guided at each corner in its up and down movement. However, irrespective of the strength of the guidance system, it is important that the hopper be stabilized in its up and down movement. The hopper is intended to carry a large quantity of supplement and therefore a large weight. Moving such weight up and down utilizing two spaced apart vertical cylinder pistons can result in the hopper tending to shift with respect to the frame, and such shifting would cause binding of the hopper to the frame and make it difficult to move the hopper up and down. For this reason, a system for stabilization of the hopper is provided, as best seen in FIGS. 3, 6, 10, 11 and 12.

As shown in FIG. 3 the hopper frame is indicated by forward and rearward structural members 76A and 76B, and side structural members 76C and 76D. Rotatably extending between the forward and rearward hopper structural members 76A and 76B is a first stabilizer shaft 78 adjacent one side of the hopper, that is, adjacent structural member 76D. In like manner, positioned at the other side of the hopper and parallel to and spaced apart from the first stabilizer shaft 78 is a second stabilizer shaft 80. Both shafts 78 and 80 are rotatably supported, such as by hopper structural member 76A, at one end and the other end of each of the shafts is rotatably supported, such as by the hopper structural member 76B. Shaft 78 has adjacent the forward end thereof, a first chain sprocket 82 and a second chain sprocket 84. At the opposite end of the first stabilizer shaft 78 are third and fourth chain sprockets 86 and 88. In like manner, the second stabilizer shaft 80 has adjacent the forward end a first and second chain sprockets 90 and 92, and adjacent the rearward end third and fourth chain sprockets 94 and 96.

Chain sprockets 82 and 90 are in the same vertical plane taken perpendicular the length of the direction of travel of the supplement spreader. In like manner, sprockets 84 and 92 are in a second vertical plane; sprocket 86 and 94 in a third vertical plane and sprockets 88 and 96 in a fourth vertical plane. All of the planes are parallel to each other.

Figure 10:
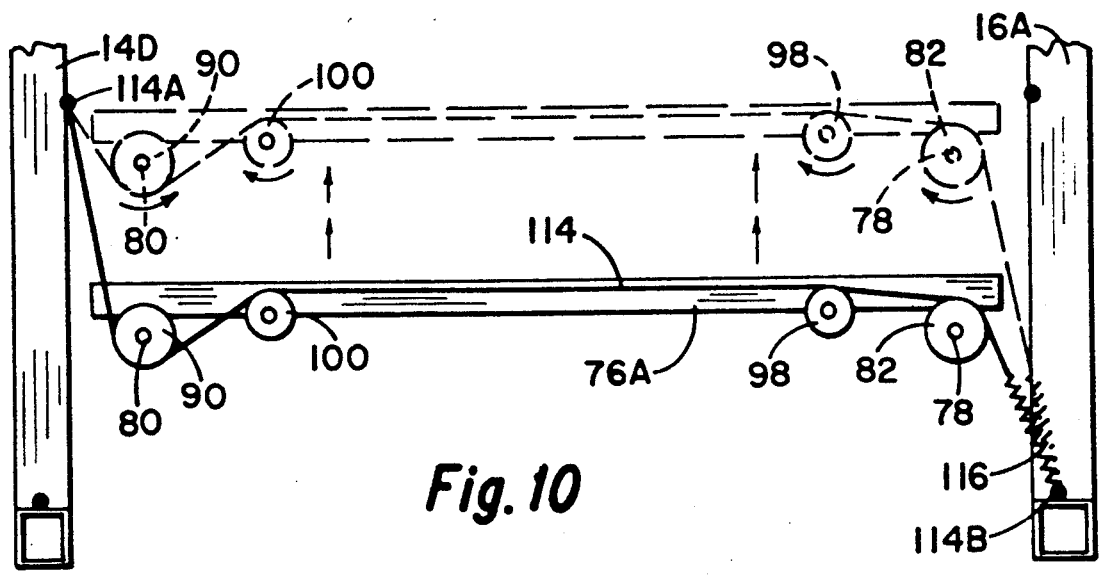
FIG. 10 is a partial cross-section view taken along the line 10—10 of FIG. 3 and showing diagrammatically the operation of the hopper stabilizer system and showing one set of sprockets and one chain, all in one vertical plane as employed in stabilizing the up and down movement of the hopper.

All of the sprockets 82 through 96 are affixed to and rotate with the shafts 78 and 82 to which they are respectfully attached. The first vertical plane having chain sprockets 82 and 90 therein also has idler sprockets 98 and 100. The second vertical plane having chain sprockets 84 and 92 therein has idler sprockets 102 and 104. The third vertical plane having chain sprockets 86 and 94 has idler sprockets 106 and 108. The fourth vertical plane having chain sprockets 88 and 96 has idler sprockets 110 and 112. FIG. 10 shows diagrammatically the first imaginary plane and the basic elements therein. The first imaginary plane includes chain sprocket 82 affixed to stabilizer shaft 78; chain sprocket 90 affixed to stabilizer shaft 80; idler sprocket 98; and idler sprocket 100. FIG. 10 shows a frame vertical structural member 16A, and spaced thereon second frame vertical structural member 14D and shows a hopper structural member 76A, it being understood that such structural member represents the hopper. A first chain 114 has a first end 114A thereof attached to the frame structural member 14D at an elevated point. The other end 114B is attached to frame structural member 16A at a lower point. The chain 114 therefore extends under chain sprocket 90 affixed to the second stabilizer shaft 80 and over the top of the first chain sprocket 82 affixed to the first stabilizer shaft 78. In addition, chain 114 extends over the idler sprockets 98 and 100. While the statement has been made that chain second end 114B is attached to frame 16A, in preferred practice the attachment is made by a use of a spring 116, the spring being a continuation of the chain and functions to take up any slack which develops in the chain.

Figure 11:
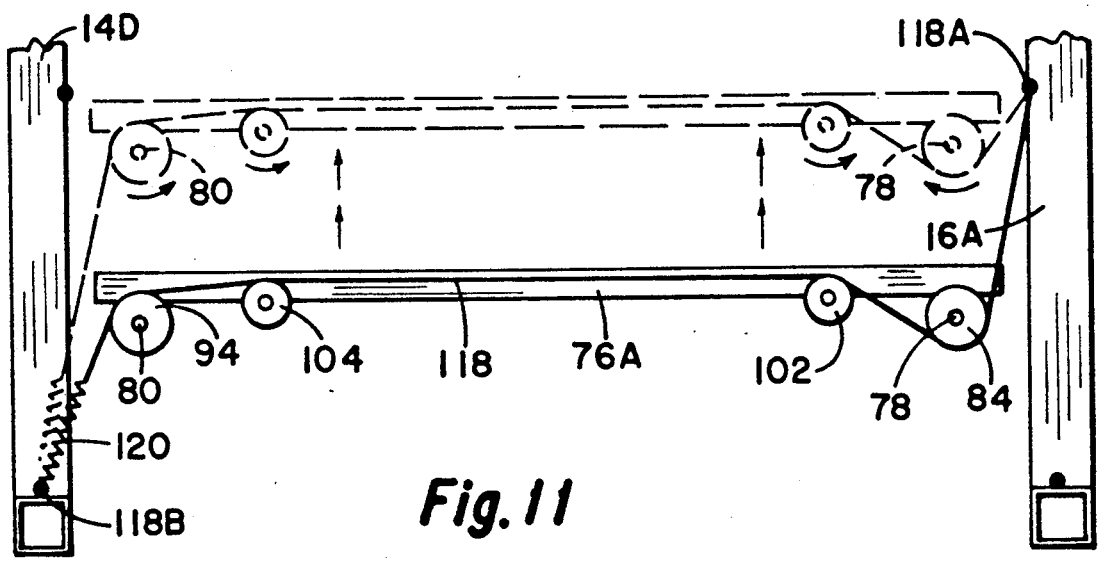
FIG. 11 is a partial elevational view as in FIG. 10 but taken in a slightly different plane and showing adjacent sprockets and a different chain as used in the hopper stabilizer system.

FIG. 11 shows the same elements of FIG. 10 but in a second imaginary plane that encompasses the second chain sprocket 84 affixed to the first stabilizer shaft 78, the third chain sprocket 94 affixed to the second stabilizer shaft 80, and the idler sprockets 102 and 104. This imaginary plane includes a second spring 120. The first end 118A of the second chain 118 is affixed at an elevated point on the frame second vertical sidewall structural member 16A and the second end 118B to a lower point of sidewall structural member 14D by means of spring 120. Chain 118 loops under the second chain sprocket 84, over the idler sprockets 102 and 104 and over the top of the third chain sprocket 94.

Figure 12:
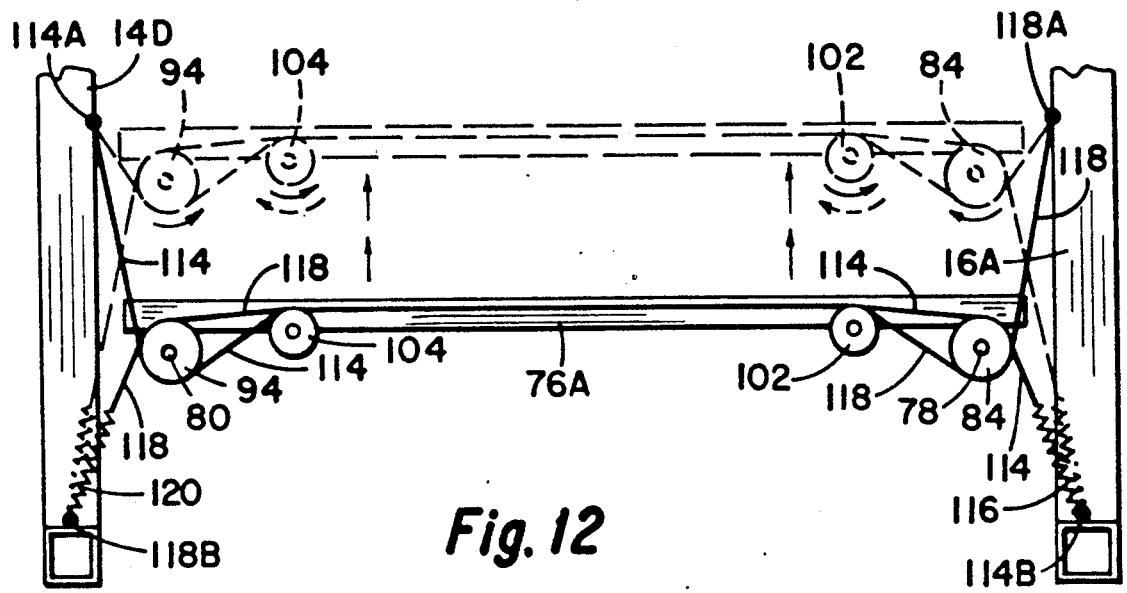
FIG. 12 is a combination of the views of FIGS. 10 and 11 showing two chains as employed at one end of the hopper for stabilizing the up and down movement of the hopper.

FIG. 12 is a composite of FIGS. 10 and 11 showing the sprockets and chains adjacent the forward end of the frame and adjacent the forward end of the hopper and showing arrangement for providing stabilization. Since the chains cannot vary substantially in length nor slip upon the sprockets to which they are attached, the chains permit free vertical up and down movement of the hopper with respect to the frame but prohibit any tendency of the hopper to tilt away from such vertical up and down movement. While FIGS. 10, 11 and 12 have been used to describe the stabilization system for the front end of the frame and hopper, the same arrangement is provided adjacent the rearward end of the hopper in the third and fourth imaginary vertical planes. In this manner four separate chains are employed, the third chain being indicated in dotted outline and identified by the numeral 122 at the rearward end of FIG. 3, and the chain in the fourth plane shown in dotted outline and identified by the numeral 124 in the fourth imaginary plane. FIG. 6 shows in more graphical relationship the chains and pulleys found at the forward end of the frame and hopper.

The disclosure herein provides a highly improved compost supplement spreader including a frame work that includes sidewalls structurally arranged to straddle and move along on the surface of the earth to either side of an elongated compost pile with a vertically positionable hopper for receiving a supplement therein and with an endless belt system for discharging supplement from the hopper. Particularly, the invention discloses a system for stabilizing the vertical positioning of the hopper with respect to the frame.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

I claim:

1. A compost supplement spreader for delivering supplement to the top of an elongated compost pile comprising:
   a frame having spaced apart sides, each side having a top and a bottom portion;
   motive means carried by said frame;
   spaced apart wheels mounted on said bottom portion of each said frame sides, at least some of said wheels being operably connected to said motive means providing for movement of the frame upon the earth, at least some of said wheels being steerable whereby said frame may be guided along said elongated compost pile with said compost pile being received between said frame sides;
   an operator station on said frame having means to control said steerable wheels;
   a hopper having an open top, an open bottom and sidewalls;
   means elevationally supporting said hopper in said frame between said sidewalls, including means to lower said hopper to a loading position whereby supplement may be deposited in said open top of said hopper and means to raise said hopper to an upper operating position;
   conveyor means that substantially closes said hopper bottom with a clearance therebetween;
   means to controllably discharge supplement from said hopper bottom by said conveyor means; and
   means when said hopper is elevationally positioned whereby said hopper bottom and said conveyor means clears the top of said compost pile.

2. A compost supplement spreader according to claim 1 including means to positionally stabilize said hopper within said frame as said hopper is moved from a lower to a higher elevation and vice versa.

3. A compost supplement spreader according to claim 2 wherein said means to positionally stabilize said hopper includes:
   a first and a second parallelled, spaced apart elongated horizontal shaft rotatably supported to said hopper;
   two spaced apart sprockets affixed adjacent each end of each of said shafts providing a sprocket affixed to each shaft in four vertical planes;
   four chains, one in each of said vertical planes, one end of each chain being affixed to said frame at an elevationally high position in a said plane and the other end being affixed to said frame at an elevationally low position, each chain looping over the top of a said sprocket affixed to one of said shafts and under the bottom of a said sprocket affixed to the other of said shafts, there being thereby a sprocket affixed to each said shaft and a chain in each of said four vertical planes whereby said hopper is stabilized in horizontal planes within said frame as said hopper is moved from a lower to a higher elevation and vice versa.

4. A compost supplement spreader according to claim 1 wherein said means to discharge supplement includes:
   spaced apart rollers and mounting means therefor supported to and below said hopper;
   said conveyor means comprising a wide, endless belt supported on said spaced apart rollers, the belt extending beneath and spaced from said hopper open bottom providing a clearance therebetween, the belt normally closing the open bottom against the discharge of supplement; and
   means of applying rotational energy to at least one of said rollers to cause said belt to rotate and thereby controllably discharge supplement from said hopper.

5. A compost supplement spreader according to claim 1 including:
   hydraulic cylinder-piston means carried by said frame;
   and structural connection between said hydraulic cylinder-piston means, and said hopper providing said means to raise and lower said hopper.

6. A compost supplement spreader for delivering supplement to the top of an elongated compost pile comprising:
   a frame having spaced apart sides, each side having a top and a bottom portion;
   motive means carried by said frame;
   spaced apart wheels mounted on said bottom portion of each said frame sides, at least some of said wheels being connected to said motive means providing means for movement of said frame upon the earth and along said elongated compost pile with said compost pile being received between said frame sides;
   a hopper having an open top, an open bottom and sidewalls;
   means elevationally supporting said hopper in said frame between said sidewalls, including means to lower said hopper to a loading position whereby supplement may be deposited in said open top of said hopper and means to raise said hopper to an upper operating positioning whereby said hopper bottom clears the top of a compost pile;
   means to controllably discharge supplement from said hopper bottom;
   a first and a second paralleled, spaced apart elongated horizontal shaft rotatably supported to said hopper;
   two spaced apart sprockets affixed adjacent each end of each of said shafts providing a sprocket affixed to each shaft in four vertical planes; and four chains, one in each of said vertical planes, one end of each chain being affixed to said frame at an elevationally high position in said plane and the other end being affixed to said frame at an elevationally low position in the same said plane, each chain looping over the top of a said sprocket affixed to one of said shafts and under the bottom of a said sprocket affixed to the other of said shafts, there being thereby a sprocket affixed to each said shaft and a chain in each of said four vertical planes providing means to positionably stabilize said hopper in horizontal planes within said frame as said hopper is moved from a lower to a higher elevation and vice versa.

7. A compost supplement spreader according to claim 6 wherein said means to controllably discharge supplement includes:

spaced apart rollers and mounting means therefor supported to and below said hopper;

a wide, endless belt supported on said spaced apart rollers, the belt extending beneath and spaced from said hopper open bottom providing a clearance therebetween, the belt normally closing the open bottom against the discharge of supplement; and means of applying rotational energy to at least one of said rollers to cause said belt to rotate and thereby controllably discharge supplement from said hopper.

8. A compost supplement spreader according to claim 6 including:

hydraulic cylinder-piston means carried by said frame;

and structural connection between said hydraulic cylinder-piston means and said hopper providing said means to raise and lower said hopper.

* * * * *